United States Patent
Hennebert et al.

(10) Patent No.: US 9,976,014 B2
(45) Date of Patent: May 22, 2018

(54) SIDEWALL FOR TIRE

(75) Inventors: Guillaume Hennebert, Mozac (FR); Arnaud Lapra, Saint Saturnin (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 253 days.

(21) Appl. No.: 13/582,837

(22) PCT Filed: Mar. 17, 2011

(86) PCT No.: PCT/EP2011/054061
§ 371 (c)(1),
(2), (4) Date: Oct. 19, 2012

(87) PCT Pub. No.: WO2011/113899
PCT Pub. Date: Sep. 22, 2011

(65) Prior Publication Data
US 2013/0160910 A1    Jun. 27, 2013

(30) Foreign Application Priority Data
Mar. 18, 2010    (FR) ..................... 10 51948

(51) Int. Cl.
  *B60C 1/00*    (2006.01)
  *C08L 9/00*    (2006.01)
  *C08K 3/04*    (2006.01)
  *C08L 7/00*    (2006.01)
  *C08K 5/01*    (2006.01)

(52) U.S. Cl.
  CPC .............. *C08L 9/00* (2013.01); *B60C 1/0025* (2013.01); *C08K 3/04* (2013.01); *C08L 7/00* (2013.01); *C08K 5/01* (2013.01); *Y02T 10/862* (2013.01); *Y10T 152/10495* (2015.01)

(58) Field of Classification Search
  CPC .......... B60C 1/0025; C08K 3/04; C08K 5/01; C08L 7/00; C08L 21/00; C08L 2666/08; C08L 9/00; Y02T 152/10495; Y02T 10/862; Y10T 152/10495
  USPC .......................................... 152/525; 524/495
  See application file for complete search history.

(56) References Cited

U.S. PATENT DOCUMENTS

| 5,977,238 | A | 11/1999 | Labauze |
| 6,013,718 | A | 1/2000 | Cabioch et al. |
| 6,503,973 | B2 | 1/2003 | Robert et al. |
| 6,815,473 | B2 | 11/2004 | Robert et al. |
| 8,376,005 | B2 | 2/2013 | Nakamura |
| 2002/0139461 | A1* | 10/2002 | Pyle et al. ............... 152/209.5 |
| 2004/0092647 | A1 | 5/2004 | Chauvin |
| 2004/0198890 | A1 | 10/2004 | Kanenari |
| 2006/0089445 | A1 | 4/2006 | Gandon-Pain |
| 2008/0110552 | A1 | 5/2008 | Arnold |

FOREIGN PATENT DOCUMENTS

| EP | 1 127 909 A1 | 8/2001 |
| FR | 2 740 778 A1 | 5/1997 |
| FR | 2 765 882 A1 | 1/1999 |
| JP | 57034140 | 2/1982 |
| JP | 2003331847 | 11/2003 |
| JP | 2004099804 A * | 4/2004 |
| JP | 2006281670 | 10/2006 |
| JP | 2010018757 | 1/2010 |
| WO | WO 97/36724 A2 | 10/1997 |
| WO | WO 99/16600 A1 | 4/1999 |
| WO | WO 01/92402 A1 | 12/2001 |
| WO | WO 02/092680 A2 | 11/2002 |
| WO | WO 03/016837 A1 | 2/2003 |
| WO | 2004013222 | 2/2004 |
| WO | WO 2004/096865 A2 | 11/2004 |
| WO | WO 2006/069792 A1 | 7/2006 |
| WO | WO 2006/069793 A1 | 7/2006 |
| WO | 2008038462 | 4/2008 |
| WO | 2008060273 | 5/2008 |

OTHER PUBLICATIONS

JP 2004-099804 A (2004), machine translation, JPO Advanced Industrial Property Network (AIPN).*
Lewis, Richard J., Sr.. Hawley's Condensed Chemical Dictionary, 15th Ed., New York: John Wiley & Sons (2007).*
*International Search Report (PCT/ISA/210) dated Apr. 26, 2011, by the European Patent Office as the International Searching Authority for International Application No. PCT/EP2011/054061.

* cited by examiner

*Primary Examiner* — Josephine L Chang
(74) *Attorney, Agent, or Firm* — Dickinson Wright PLLC

(57) ABSTRACT

The invention relates to a tire sidewall, at least one portion of which has a rubber composition based on at least a diene elastomer, a crosslinking system and a reinforcing filler, wherein the content of reinforcing filler in the composition varies from 20 to 40 parts by weight per hundred parts of elastomer, phr, with a volume fraction of reinforcing filler in the composition ranging from 8.0% to 13.0%, and in that this reinforcing filler comprises predominantly a carbon black or a mixture of carbon blacks with a BET specific surface area ranging from 50 m$^2$/g to 69 m$^2$/g.

23 Claims, No Drawings

SIDEWALL FOR TIRE

BACKGROUND

1. Field

The disclosure relates to a tire having sidewalls based on a rubber composition, and more particularly to a tire intended to be fitted onto passenger motor vehicles.

2. Description of Related Art

A tire usually comprises two beads intended to come into contact with a rim, a crown composed of at least one crown reinforcement and a tread, and two sidewalls, the tire being reinforced by a carcass reinforcement anchored in the two beads.

A sidewall is an elastomeric layer positioned on the outside of the carcass reinforcement relative to the internal cavity of the tire, between the crown and the bead so as to completely or partially cover the carcass reinforcement zone extending from the crown to the bead.

The tire sidewalls, very particularly the tire sidewalls of a vehicle being driven in an urban environment, are subjected to wear which results from rubbing against pavements. This phenomenon, also referred to as curbing, has the effect of wearing down the outer surface of the sidewalls. This wear may lead to a deterioration that renders the tire unusable. Specifically, the carcass reinforcement must not be damaged. This is why, to protect the carcass reinforcement from physical stresses such as curbing or chemical stresses such as ozone, the sidewall must be sufficiently resistant to curbing wear. To improve this wear resistance, a person skilled in the art generally resorts to the use of rubber compositions comprising reinforcing fillers at relatively high contents.

Given the deformation cycles such as the flexion to which the sidewall is subjected, a composition must, in order to be able to be used as a sidewall, have the lowest possible hysteresis and make the sidewall sufficiently flexible. Those skilled in the art find themselves confronted with the problem of reconciling low rolling resistance and flexibility of the sidewalls. However, the introduction of high contents of reinforcing fillers, although required in order to improve the properties of resistance to curbing, as has been seen above, has the effect of increasing the rolling resistance and reducing the flexibility of the compositions in question.

Furthermore, the flexion cycles undergone by the sidewall when the tire is rolling, in particular if these cycles are combined with the action of ozone, may make cracks or fissures appear, especially in the sidewall, preventing the tire from being used independently of the tread wear.

Those skilled in the art must therefore find a solution for improving the sidewall's resistance to curbing without adversely affecting the low rolling resistance and good crack resistance performances.

As illustrated in numerous documents, among which mention may be made of documents EP 1 462 479 B1, EP 1 975 200 A1, EP 1 033 265 B1, EP 1 357 149 A2, EP 1 231 080 A1 and U.S. Pat. No. 4,824,900, the compositions conventionally used for sidewalls are based on natural rubber and on synthetic rubber such as polybutadiene, and on carbon black.

For passenger vehicles, it is known for those skilled in the art to more preferably use carbon blacks with a BET specific surface area strictly less than 49 m$^2$/g. For heavy-duty vehicles, carbon blacks with a BET specific surface area between 70 and 99 m$^2$/g are conventionally used. The proportion of carbon black introduced into a sidewall, both for passenger vehicles and for heavy-duty vehicles, is customarily around 50 parts by weight per hundred parts of elastomer (phr) with a volume fraction of at least 15%, the volume fraction corresponding to the volume of carbon black relative to the volume of all of the constituents of the composition, as defined in more detail in paragraph I-1.

SUMMARY

The Applicant has surprisingly discovered that the use of carbon black or of a mixture of carbon blacks with a BET specific surface area ranging from 50 to 69 m$^2$/g as the predominant reinforcing filler in the sidewall rubber compositions, with a content of reinforcing filler of much less than 50 phr and with a volume fraction of reinforcing filler of much less than 15%, made it possible to improve the sidewall's resistance to curbing without adversely affecting the good crack resistance and low rolling resistance performances, or even to improve one or other of these two properties.

The invention, in one embodiment, relates to a tire sidewall, at least one portion of which has a rubber composition based on at least a diene elastomer, a crosslinking system and a reinforcing filler, characterized in that the content of reinforcing filler in the composition varies from 20 to 40 phr with a volume fraction of reinforcing filler in the composition ranging from 8.0% to 13.0%, and in that this reinforcing filler comprises predominantly a carbon black or a mixture of carbon blacks with a BET specific surface area ranging from 50 m$^2$/g to 69 m$^2$/g.

Another subject of the invention is a process for preparing a tire sidewall composition based on at least a diene elastomer, a crosslinking system and a reinforcing filler, characterized in that the content of reinforcing filler in the composition varies from 20 to 40 phr with a volume fraction of reinforcing filler in the composition ranging from 8.0% to 13.0%, and that this reinforcing filler comprises predominantly a carbon black or a mixture of carbon blacks with a BET specific surface area ranging from 50 m$^2$/g to 69 m$^2$/g, and in that the process comprises the following steps:
  thermomechanically kneading the diene elastomer and the reinforcing filler until a maximum temperature of between 110° C. and 190° C. is reached;
  cooling the mixture down to a temperature below 100° C.;
  then incorporating the crosslinking system;
  kneading everything until a maximum temperature below 110° C. is reached in order to obtain a rubber composition,
  calendering or extruding the rubber composition.

The invention, in one embodiment, also relates to a tire comprising a sidewall, at least one portion of which has a rubber composition which is based on at least a diene elastomer, a crosslinking system and a reinforcing filler, characterized in that the content of reinforcing filler in the composition varies from 20 to 40 phr with a volume fraction of reinforcing filler in the composition ranging from 8.0% to 13.0%, and in that this reinforcing filler comprises predominantly a carbon black or a mixture of carbon blacks with a BET specific surface area ranging from 50 m$^2$/g to 69 m$^2$/g.

Advantageously, the tire in accordance with embodiments of the invention is intended to be fitted onto heavy-duty or passenger vehicles, more preferably passenger vehicles.

DETAILED DESCRIPTION OF SPECIFIC EMBODIMENTS

I. Measurements and Tests Used

The rubber compositions or the sidewalls comprising them are characterized after curing as indicated below.

I-1 Volume Fraction of Reinforcing Filler

The volume fraction of reinforcing filler in a rubber composition is defined as being the ratio of the volume of the reinforcing filler to the volume of all of the constituents of the composition, it being understood that the volume of all of the constituents is calculated by adding up the volume of each of the constituents of the composition. The volume fraction of reinforcing filler in a composition is therefore defined as the ratio of the volume of the reinforcing filler to the sum of the volumes of each of the constituents of the composition.

I-2 Rolling Resistance Performance

The dynamic properties tan $\delta_{max}$ are measured on a viscosity analyser (Metravib VA4000) according to the ASTM D 5992-96 standard. The response of a sample of vulcanized composition (cylindrical test specimen with a thickness of 2 mm and with a cross section of 79 mm$^2$), subjected to a simple alternating sinusoidal shear stress, at a frequency of 10 Hz, under standard temperature conditions (23° C.) according to the ASTM D 1349-09 standard, is recorded. A peak-to-peak strain amplitude sweep is carried out from 0.1 to 50% (forward cycle) and then from 50 to 0.1% (return cycle). The results gathered are the loss factor tan $\delta$. For the return cycle, the maximum value of tan $\delta$ observed (tan $\delta_{max}$) is indicated.

The performance index is the ratio of the tan $\delta_{max}$ value of the control composition to the tan max value of the example considered. Since the control has an index of 100, a value above 100 indicates a better rolling resistance performance.

I-3 Crack Performance

A tire of dimension 205/55R16 is made to roll at 70 km/h on a flywheel, the sidewalls of which tire are first notched with cracks having a length of 20 mm and a depth of 1.7 mm. The test is stopped after 25 000 km or when a pressure drop is observed.

The performance index is the ratio of the length propagated at the surface of the control tire to the length propagated at the surface of the tire to be measured. Since the control has an index of 100, a value above 100 indicates a better crack resistance performance.

I-4 Sidewall Curbing Performance

This test is performed on a vehicle, the front left tire of which rubs against the pavement in slow motion. The test is stopped when cords of the carcass ply appear or when a pressure drop is observed. The result provided is the loss of mass of the tire per distance travelled. The performance index is the ratio of the loss of mass per distance travelled of the control to that of the example considered. Since the control has an index of 100, a value above 100 indicates a better curbing resistance performance.

II—Detailed Description of the Invention

In the present description, unless expressly indicated otherwise, all the percentages (%) indicated are % by weight. Moreover, any interval of values denoted by the expression "between a and b" represents the range of values extending from greater than a to less than b (i.e., limits a and b excluded), whereas any interval of values denoted by the expression "from a to b" means the range of values extending from a up to b (i.e., including the strict limits a and b).

The sidewall in accordance with the invention has the essential feature of being constituted of at least one portion having a rubber composition based on at least a diene elastomer, a crosslinking system and a reinforcing filler, characterized in that the content of reinforcing filler in the composition varies from 20 to 40 phr with a volume fraction of reinforcing filler in the composition ranging from 8.0% to 13.0%, and in that this reinforcing filler comprises predominantly a carbon black or a mixture of carbon blacks with a BET specific surface area ranging from 50 m$^2$/g to 69 m$^2$/g.

According to one preferential embodiment, this portion of sidewall is located on the outer face of the sidewall.

According to another preferential embodiment, this portion of sidewall extends from the crown to the bead.

According to another preferential embodiment, this portion of sidewall comprising the composition according to the invention may be in the form of a profiled element applied to the zone of the sidewall which is liable to rub against the pavements.

Where appropriate, the other optional constituent portions of the sidewall may be based on different rubber compositions known to those skilled in the art, for example based on carbon black N550 or N660 (defined according to the ASTM D1765-06 standard) for volume fractions of filler of at least 15.0%.

II-1. Diene Elastomer

The term "diene" elastomer or rubber should be understood as meaning, in a known manner, an (one or more are understood) elastomer resulting at least in part (i.e., a homopolymer or a copolymer) from diene monomers (monomers bearing two carbon-carbon double bonds which may or may not be conjugated).

These diene elastomers can be classified into two categories: "essentially unsaturated" or "essentially saturated". The expression "essentially unsaturated" is generally understood to mean a diene elastomer resulting at least partly from conjugated diene monomers, having a content of units of diene origin (conjugated dienes) that is greater than 15% (mol %). Thus, diene elastomers such as butyl rubbers or diene/.alpha.-olefin copolymers of the EPDM type do not fall under the preceding definition and may especially be described as "essentially saturated" diene elastomers (low or very low content of units of diene origin, always less than 15%). In the "essentially unsaturated" diene elastomer category, the expression "highly unsaturated" diene elastomer is understood in particular to mean a diene elastomer having a content of units of diene origin (conjugated dienes) that is greater than 50%.

Having given these definitions, it will be understood more particularly that a diene elastomer capable of being used in the invention means:

- any homopolymer obtained by polymerization of a conjugated diene monomer having from 4 to 12 carbon atoms;
- any copolymer obtained by copolymerization of one or more conjugated dienes with one another or with one or more vinylaromatic compounds having from 8 to 20 carbon atoms;
- a ternary copolymer obtained by copolymerization of ethylene and of an α-olefin having from 3 to 6 carbon atoms with an unconjugated diene monomer having from 6 to 12 carbon atoms, such as, for example, the elastomers obtained from ethylene and propylene with an unconjugated diene monomer of the abovementioned type, such as, in particular, 1,4-hexadiene, ethylidene norbornene or dicyclopentadiene;

a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units.

The elastomers may have any microstructure which depends on the polymerization conditions used, in particular on the presence or absence of a modifying and/or randomizing agent and on the amounts of modifying and/or randomizing agent employed. The elastomers may, for example, be block, random, sequential or microsequential elastomers and may be prepared in dispersion or in solution; they may be coupled and/or star-branched or else functionalized with a coupling and/or star-branching or functionalizing agent. Mention may be made, for example, for coupling to carbon black, of functional groups comprising a C—Sn bond or amino functional groups, such as benzophenone, for example; mention may be made, for example, for coupling to a reinforcing inorganic filler, such as silica, of silanol or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

The following are suitable: polybutadienes, in particular those having a content (molar %) of 1,2-units of between 4% and 80% or those having a content (molar %) of cis-1,4-units of greater than 80%, polyisoprenes, butadiene-styrene copolymers and in particular those having a $T_g$ (glass transition temperature Tg, measured according to standard ASTM D3418) of between 0° C. and −70° C. and more particularly between −10° C. and −60° C., a styrene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene-isoprene copolymers, in particular those having an isoprene content of between 5% and 90% by weight and a $T_g$ of −40° C. to −80° C., or isoprene-styrene copolymers, in particular those having a styrene content of between 5% and 50% by weight and a $T_g$ of between −25° C. and −50° C. In the case of butadiene-styrene-isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene-styrene-isoprene copolymer having a $T_g$ of between −20° C. and −70° C., are suitable in particular.

Preferably, the diene elastomer used in the invention is chosen from the group of the highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably chosen from the group consisting of butadiene-styrene copolymers (SBRs), isoprene-butadiene copolymers (BIRs), isoprene-styrene copolymers (SIRs) and isoprene-butadiene-styrene copolymers (SBIRs).

The rubber composition according to the invention may contain a single diene elastomer or a mixture of several diene elastomers, it being possible for the diene elastomer(s) to be used in combination with any type of synthetic elastomer other than a diene elastomer, or even with polymers other than elastomers, for example thermoplastic polymers.

According to one particular embodiment, the rubber composition may contain at least one essentially saturated diene elastomer, in particular at least one EPDM copolymer or one butyl rubber (optionally chlorinated or brominated), whether these copolymers are used alone or as a blend with highly unsaturated diene elastomers as mentioned above, in particular NR or IR, BR or SBR.

According to one preferred embodiment, use is made, as diene elastomer in the composition, of a mixture of elastomers composed of 30 to 55% of natural rubber, of a synthetic polyisoprene or of a mixture of natural rubber and of a synthetic polyisoprene, and of 45 to 70% of a diene elastomer chosen from polybutadienes, styrene-butadiene copolymers, isoprene-butadiene copolymers, isoprene-styrene copolymers and isoprene-butadiene-styrene terpolymers and the mixtures thereof.

The synthetic polyisoprene is preferably a synthetic cis-1,4-polyisoprene; preferably a polyisoprene having a content (molar %) of cis-1,4-bonds of greater than 90%, preferably greater than or equal to 98%.

According to one more preferred embodiment, use is made of a mixture composed of 30 to 55% of natural rubber, of a synthetic polyisoprene or of a mixture of natural rubber and of a synthetic polyisoprene, and of 45 to 70% of a polybutadiene, preferably a cis-1,4-polybutadiene, i.e. a polybutadiene having a content of cis-1,4-bonds of greater than 90% (molar %), preferably greater than or equal to 96% (molar %).

Advantageously, the polybutadiene may be coupled and/or star-branched or else functionalized, with a coupling and/or star-branching or functionalizing agent for coupling to carbon black or to silica, as described previously. The functionalization of the polybutadiene may also be carried out during the step of initiating the butadiene polymerization reaction using a functional initiator such as, for example, an organolithium bearing an amine function, a lithium amide or an organotin lithium compound.

II-2. Reinforcing Filler

The reinforcing filler comprises, as organic filler, at least one (i.e. one or more) carbon blacks having a BET specific surface area ranging from 50 m$^2$/g to 69 m$^2$/g. These carbon blacks are for example the SR401 blacks from Sid Richardson and Spheron 1416 blacks from Cabot. The carbon blacks could be, for example, already incorporated into the isoprene elastomer in the form of a masterbatch (see, for example, applications WO 97/36724 or WO 99/16600).

It is stated that the BET specific surface area was measured according to the ASTM D6556-09 standard [multipoint (5 point) method—gas: nitrogen—relative pressure range P/P0: 0.05 to 0.30].

Also suitable as carbon black is a mixture of carbon blacks characterized in that the mixture of carbon blacks has a BET specific surface area ranging from 50 m$^2$/g to 69 m$^2$/g. In particular, the carbon blacks constituting such a mixture are carbon blacks of different ASTM grades.

As an essential feature of the invention, use is made, in the rubber composition, of 20 to 40 phr of a reinforcing filler predominantly comprising a carbon black or a mixture of carbon blacks having a BET specific surface area ranging from 50 m$^2$/g to 69 m$^2$/g with a volume fraction of the reinforcing filler in the composition ranging from 8.0% to 13.0%. The term "predominantly" means that the carbon black or the mixture of carbon blacks with a BET specific surface area ranging from 50 m$^2$/g to 69 m$^2$/g represents more than 50% by weight of the reinforcing filler.

This two-fold condition relating to the range of 20 to 40 phr of reinforcing filler (which comprises, as already stated, predominantly a carbon black or a mixture of carbon blacks with a BET specific surface area ranging from 50 m$^2$/g to 69 m$^2$/g) and of 8.0 to 13.0% of volume fraction is necessary in order to satisfy the stated problem. Specifically:

above 40 phr of reinforcing filler with a volume fraction of this reinforcing filler of greater than 13.0%, the composition becomes too hysteretic and too rigid for an application as a tire sidewall;

above 40 phr of reinforcing filler with a volume fraction of this reinforcing filler between 8.0% and 13.0%, the content of diene elastomer in the composition is too low to ensure a sufficient cohesion of the composition;

below 20 phr of reinforcing filler, independently of the volume fraction of this reinforcing filler, the amount of reinforcing filler is too small to enable a sufficient reinforcement of the sidewall composition;

a volume fraction of reinforcing filler of less than 8.0%, independently of the content of reinforcing filler, corresponds to too high a dilution of the filler, which leads to a decrease in curbing wear;

the range that corresponds to contents of reinforcing filler between 20 and 40 phr with a volume fraction of this reinforcing filler of greater than 13.0% does not make it possible to obtain a composition having the desired compromise of properties. Indeed, for the lowest contents of reinforcing filler in this range (i.e. close to the lower limit) it is impossible to achieve a volume fraction of reinforcing filler of greater than 13.0%, and for the highest contents of this range the composition is too rigid and/or too hysteretic for an application as a tire sidewall.

Since the reinforcing filler predominantly consists of carbon black or of a mixture of carbon blacks having a BET specific surface area ranging from 50 m$^2$/g to 69 m$^2$/g, this reinforcing filler may comprise, in a minor amount, one or more other reinforcing fillers. Reinforcing organic fillers and reinforcing inorganic fillers are suitable as other reinforcing fillers.

As a reinforcing organic filler other than a carbon black or other than a mixture of carbon blacks having a BET specific surface area ranging from 50 m$^2$/g to 69 m$^2$/g, mention may be made of the carbon blacks with a BET specific surface area of strictly less than 50 m$^2$/g such as, by way of example, carbon black N683 or carbon black N550, or the carbon blacks with a BET specific surface area of strictly greater than 69 m$^2$/g, such as carbon black N110 or carbon black N299. Functionalized polyvinyl aromatic organic fillers as described in applications WO-A-2006/069792 and WO-A-2006/069793 are also suitable as reinforcing organic fillers.

The expression "reinforcing inorganic filler" should be understood, in the present application, by definition, to mean any inorganic or mineral filler (whatever its colour and its origin (natural or synthetic)), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the expression "reinforcing inorganic filler" is also understood to mean mixtures of various reinforcing inorganic fillers, in particular of highly dispersible siliceous and/or aluminous fillers as described below.

Mineral fillers of the siliceous type, in particular silica (SiO$_2$), or of the aluminous type, in particular alumina (Al$_2$O$_3$), are suitable in particular as reinforcing inorganic fillers. The silica used may be any reinforcing silica known to a person skilled in the art, in particular any precipitated or pyrogenic silica having a BET surface area and a CTAB specific surface area that are both less than 450 m$^2$/g, preferably from 30 to 400 m$^2$/g. Mention will be made, as highly dispersible precipitated silicas (HDSs), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

The proportion of reinforcing filler other than the carbon black or the mixture of carbon blacks having a BET specific surface area ranging from 50 m$^2$/g to 69 m$^2$/g is adjusted depending on its BET specific surface area and depending on the compromise of performance desired. Thus, for example, it is possible to use a carbon black with a BET specific surface area of strictly greater than 69 m$^2$/g to optimize the wear resistance while being careful not to adversely affect the rolling resistance by minimizing the amount thereof. It is also possible to use, for example, as the minor reinforcing filler in the composition in accordance with the invention, a carbon black having a BET specific surface area of strictly less than 50 m²/g, which is favourable for optimizing the low rolling resistance performance.

According to one preferred embodiment, the carbon black or the mixture of carbon blacks having a BET specific surface area ranging from 50 m²/g to 69 m²/g constitutes at least 85% by weight of the reinforcing filler. More preferably still it constitutes at least 95% of the reinforcing filler. Advantageously the carbon black or the mixture of carbon blacks with a BET specific surface area ranging from 50 m²/g to 69 m²/g is used exclusively as reinforcing filler, i.e. it constitutes 100% of the reinforcing filler.

According to another preferred embodiment, the proportion of reinforcing filler in the rubber composition varies from 20 phr to 35 phr, and more advantageously from 25 phr to 30 phr. When the reinforcing filler is used preferably in a proportion ranging from 20 phr to 35 phr, and more preferably still from 25 phr to 30 phr, the volume fraction of reinforcing filler preferably varies from 8.0% to 10.0%, more preferably from 8.7% to 9.4% and more preferably still from 8.9% to 9.2%. These preferred ranges in terms of content and volume fraction of reinforcing filler are preferred embodiments that make it possible to optimize the compromise between the rolling resistance, crack resistance and curbing resistance performances, in so far as the compositions for which the content and the volume fraction of reinforcing filler adhere to these preferred ranges, have an increase in curbing resistance while improving the low rolling resistance performance or the good crack resistance performance.

According to another embodiment, the carbon black or the mixture of carbon blacks having a BET specific surface area ranging from 50 m²/g to 69 m²/g has a COAN absorption number ranging from 80 ml/100 g to 120 ml/100 g. This range of values of the COAN number is favourable for imparting even better properties to the sidewall rubber composition. Indeed, a carbon black or a mixture of carbon blacks with a COAN number of less than 120 ml/100 g stiffens the sidewall rubber composition less than a carbon black with a COAN number of greater than 120 ml/100 g, whilst the use of a carbon black or of a mixture of carbon blacks with a COAN number of greater than 80 ml/100 g makes it possible to achieve a better dispersion of said carbon black or of said mixture of carbon blacks in the sidewall rubber composition. It is stated that the COAN number is determined according to the ASTM D3493-09 standard.

II.3—Crosslinking System

The crosslinking system is preferably a vulcanization system, i.e. a system based on sulphur (or on a sulphur donor agent) and on a primary vulcanization accelerator. Added to this vulcanization system, incorporated during the first non-productive phase and/or during the productive phase as described further on, are various known secondary vulcanization accelerators or vulcanization activators, such as zinc oxide, stearic acid or equivalent compounds, guanidine derivatives (in particular diphenylguanidine).

The sulphur is used at a preferred content of between 0.5 and 12 phr, in particular between 1 and 10 phr, preferably between 1 and 3 phr. The primary vulcanization accelerator is used at a content of between 0.5 and 10 phr, preferably between 0.5 and 5.0 phr, more preferably between 0.5 and 3 phr.

Use may be made, as (primary or secondary) accelerator, of any compound capable of acting as accelerator of the vulcanization of diene elastomers in the presence of sulphur, in particular accelerators of the thiazole type and also their derivatives, accelerators of the thiuram and zinc dithiocarbamate types. These accelerators are for example selected from the group consisting of 2-mercaptobenzothiazyl disulphide (abbreviated to "MBTS"), 20-tetrabenzylthiuram disulphide ("TBZTD"), N-cyclohexy-2-benzothiazyl sulphenamide ("CBS"), N,N-dicyclohexy-2-benzothiazyl sulphenamide ("DCBS"), N-tert-butyl-2-benzothiazyl sulphenamide ("TBBS"), N-tent-butyl-2-benzothiazyl sulphenimide ("TBSI"), zinc dibenzyldithiocarbamate ("ZBEC") and mixtures of these compounds.

II-4. Various Additives

According to the invention, the rubber composition may also comprise all or some of the standard additives customarily used in elastomer compositions intended for the manufacture of tires or semi-finished products for tires, such as for example plasticizers, preferably non-aromatic or very slightly aromatic plasticizers, for example naphthenic or paraffinic oils, MES or TDAE oils, glycerol esters (in particular trioleates), especially natural esters, such as rapeseed or sunflower vegetable oils, pigments, protective agents, such as antiozonants, antioxidants, anti-fatigue agents or anti-reversion agents.

Among the antioxidants, mention may especially be made of the derivatives of para-phenylenediamine (abbreviated to "PPD" or "PPDA"), also referred to, in a known manner, as substituted para-phenylenediamines, such as for example N-1,3-dimethylbutyl-N-phenyl-p-phenylenediamine (better known by the abbreviation "6-PPD"), N-isopropyl-N'-phenyl-p-phenylenediamine (abbreviated to "I-PPD"), phenyl-cyclohexyl-p-phenylenediamine, N,N'-di(1,4-dimethylpentyl-p-phenylenediamine, N,N'-diaryl-p-phenylenediamine ("DTPD"), diaryl-p-phenylenediamine ("DAPD"), 2,4,6-tris-(N-1,4-dimethylpentyl-p-phenylenediamino)-1,3,5-triazine, and mixtures of such diamines. Mention may also be made of quinoline derivatives ("TMQ") such as for example 1,2-dihydro-2,2,4-trimethylquinoline 5 and 6-ethoxy-1,2-dihydro-2,2,4-trimethylquinoline. Mention may also be made of substituted diphenylamines or triphenylamines, as described for example in applications WO 2007/121936 and WO 2008/055683, in particular 4,4'-bis(isopropylamino)triphenylamine, 4,4'-bis(1,3-dimethylbutylamino)triphenylamine, 4,4'-bis(1,4-dimethylpentylamino)triphenylamine. Preferably, the antioxidant is chosen from the group consisting of substituted p-phenylenediamines, substituted diphenylamines, substituted triphenylamines, quinoline derivatives, and the mixtures of such compounds.

According to one preferred embodiment, the rubber composition according to the invention comprises a plasticizer chosen from naphthenic or paraffinic oils, MES or TDAE oils or mixtures thereof.

The composition may also contain, in addition to coupling agents, coupling activators, agents for covering the inorganic fillers or more generally processing aids capable, in a known manner, by virtue of an improvement in the dispersion of the filler in the rubber matrix and a lowering of the viscosity of the compositions, of improving their ability to be processed in the uncured state, these agents being, for example, hydrolysable silanes, such as alkylalkoxysilanes, polyols, polyethers, primary, secondary or tertiary amines or hydroxylated or hydrolysable polyorganosiloxanes.

II-5. Manufacture of the Rubber Composition

The rubber composition is manufactured in appropriate mixers using two successive preparation phases well known to a person skilled in the art: a first phase of thermomechanical working or kneading (referred to as a "non-productive" phase) at high temperature, up to a maximum temperature of between 110° C. and 190° C., preferably between 130° C. and 180° C., followed by a second phase of mechanical working (referred to as a "productive" phase) up to a lower temperature, typically of less than 110° C., for example between 40° C. and 100° C., finishing phase during which the crosslinking system is incorporated.

The process in accordance with the invention for preparing a tire sidewall composition based on at least a diene elastomer, a crosslinking system and a reinforcing filler, characterized in that the content of reinforcing filler in the composition varies from 20 to 40 phr with a volume fraction of reinforcing filler in the composition ranging from 8.0% to 13.0%, and in that this reinforcing filler comprises predominantly a carbon black or a mixture of carbon blacks with a BET specific surface area ranging from 50 $m^2/g$ to 69 $m^2/g$, and in that the process comprises the following steps:

thermomechanically kneading the diene elastomer and the reinforcing filler until a maximum temperature of between 110° C. and 190° C. is reached;

cooling the mixture down to a temperature below 100° C.;

then incorporating the crosslinking system;

kneading everything until a maximum temperature below 110° C. is reached in order to obtain a rubber composition, calendering or extruding the rubber composition.

The first kneading step is generally carried out by incorporating the reinforcing filler into the elastomer in one or more stages by thermomechanically kneading. In the case where the reinforcing filler, in particular the carbon black or the mixture of carbon blacks having a BET specific surface area ranging from 50 $m^2/g$ to 69 $m^2/g$, is already completely or partly incorporated into the elastomer in the form of a masterbatch, as is described for example in application WO 97/36724 or WO 99/16600, it is the masterbatch that is directly kneaded and, where appropriate, the other elastomers or reinforcing fillers present in the composition that are not in the form of a masterbatch are incorporated.

According to one preferred embodiment of the process, the carbon black or the mixture of carbon blacks having a BET specific surface area ranging from 50 $m^2/g$ to 69 $m^2/g$ constitutes at least 85%, preferably at least 95%, more preferably still 100% by weight of the reinforcing filler.

According to another preferred embodiment of the process, the proportion of reinforcing filler varies from 20 phr to 35 phr, preferably from 25 phr to 30 phr.

According to another preferred embodiment of the process, the volume fraction of reinforcing filler varies from 8.0% to 10.0%, preferably from 8.7% to 9.4%.

The first two steps may be carried out one after the other using the same mixer or may be separated by a step of cooling to a temperature below 100° C., the final step then being carried out using a second mixer.

By way of example, the first phase is carried out in a single thermomechanical step during which all the necessary base constituents (the elastomer in its entirety or in part, the reinforcing filler in its entirety or in part, and the coupling agent if necessary) are firstly introduced into a suitable mixer, such as a standard internal mixer, and then secondly, for example after kneading for one to two minutes, the remainder of the elastomer and of the reinforcing filler where appropriate, the other additives, optional covering agents or complementary processing aids, with the exception of the crosslinking system, are introduced. After cooling of the mixture thus obtained, the crosslinking system is then incorporated in an external mixer, such as an open mill, maintained at low temperature (for example between 40° C. and 100° C.). All the ingredients are then mixed for a few minutes, for example between 2 and 15 minutes.

The final composition thus obtained is then calendered, for example in the form of a sheet or a slab, especially for laboratory characterization, or else extruded in order to form, for example, a rubber profiled element used for producing semi-finished products such as a sidewall layer.

The crosslinking (or curing), where appropriate the vulcanization, is carried out, in a known manner, at a temperature generally between 130° C. and 200° C. for a sufficient time, which may vary for example between 5 and 90 minutes, depending in particular on the curing temperature, on the crosslinking system adopted and on the crosslinking kinetics of the composition in question.

The following examples illustrate the invention without however limiting it.

III. Exemplary Embodiments of the Invention

III-1 Preparation of the Rubber Compositions

The tests which follow are carried out in the following manner: introduced into an internal mixer, which is 70% filled and has an initial vessel temperature of approximately 90° C., are the diene elastomer (NR and BR mixture) and the carbon black, then, after kneading for one to two minutes, the various other ingredients such as the antioxidant, the antiozonant, the vulcanization activators, with the exception of the vulcanization system, are introduced. Thermomechanical working (non-productive phase) is then carried out in one step (total kneading time equal to approximately 5 min), until a maximum "dropping" temperature of approximately 165° C. is reached. The mixture thus obtained is recovered and cooled and then the vulcanization system (sulphur and sulphenamide accelerator) is added on an external mixer (homofinisher) at 70° C., all the ingredients being mixed (productive phase) for approximately 5 to 6 min.

The compositions thus obtained are then calendered in the form of slabs (thickness of 2 to 3 mm) or of fine sheets of rubber, for the measurement of their physical or mechanical properties, or extruded in the form of profiled elements that can be used directly, after cutting and/or assembling to the desired dimensions, in order to obtain a sidewall.

III-2. Tests

The purpose of the tests is to show the improvement in the properties of the tire sidewalls in accordance with the invention compared to a control tire sidewall for a passenger vehicle. They also demonstrate that the compositions, although they comprise a carbon black with a specific surface area ranging from 50 $m^2/g$ to 69 $m^2/g$, do not make it possible to solve the technical problem of the invention due either to a content of reinforcing filler that is not in accordance with the invention, or to a volume fraction of reinforcing filler that is not in accordance with the invention, or else due to a content and a volume fraction of reinforcing filler that are both not in accordance with the invention.

The six sidewall compositions A, B, C, D, E and F were manufactured in accordance with the process explained in detail in the previous section. These compositions, listed in Table 1 (where the amounts are expressed in phr), differ in terms of the nature and content of reinforcing filler, and also in terms of the volume fraction of reinforcing filler.

Thus, the compositions A, B, C, D, E and F are defined as follows:

control composition A conventionally used as a sidewall for a passenger vehicle, comprises 50 phr of a carbon black with a BET specific surface area equal to 39 $m^2/g$ with a volume fraction of reinforcing filler equal to 15.5%, composition B in accordance with the invention comprises 28 phr of a carbon black with a BET specific surface area equal to 62 m²/g with a volume fraction of reinforcing filler equal to 9.2%, composition C in accordance with the invention comprises 25 phr of a carbon black with a BET specific surface area equal to 62 m²/g with a volume fraction of reinforcing filler equal to 9.1%, composition D in accordance with the invention comprises 25 phr of a mixture of carbon blacks with a BET specific surface area equal to 64 m²/g, composed of 60% of N347 and 40% of N683, with a volume fraction of reinforcing filler equal to 9.1%, composition E, which is not in accordance with the invention due to the content and the volume fraction of reinforcing filler, comprises 43 phr of a carbon black with a BET specific surface area equal to 62 m²/g with a volume fraction of reinforcing filler equal to 15.2%, composition F, which is also not in accordance with the invention due to the content of reinforcing filler, comprises 43 phr of a carbon black with a BET specific surface area equal to 62 m²/g with a volume fraction of reinforcing filler equal to 12.4%.

It is noted that composition D in accordance with the invention differs from composition C in that the reinforcing filler of composition D is a mixture of carbon blacks which is composed of 60% of N347 and 40% of N683 and which is characterized by a BET specific surface area of 64 m²/g and a COAN oil absorption number of 93 ml/100 g. These BET and COAN values were measured under the same measurement conditions as for the carbon black used in composition C.

TABLE 1

| Composition: | A control | B | C | D | E | F |
|---|---|---|---|---|---|---|
| NR (1) | 50 | 50 | 50 | 50 | 50 | 50 |
| BR (2) | 50 | 50 | 50 | 50 | 50 | 50 |
| Carbon black (3) | 50 | — | — | — | — | — |
| Carbon black (4) | — | 28 | 25 | — | 43 | 43 |
| Carbon black (5) | — | — | — | 25 | — | — |
| Plasticizer (6) | 20 | 22 | 10 | 10 | 5 | 13 |
| Antiozone wax | 1 | 1 | 1 | 1 | 1 | 1 |
| Antioxidant (7) | 4 | 4 | 4 | 4 | 4 | 4 |
| ZnO | 2.5 | 2.5 | 2.5 | 2.5 | 2.5 | 2.5 |
| Stearic acid | 1.1 | 1.1 | 1.1 | 1.1 | 1.1 | 1.1 |
| Sulfur | 1.4 | 1.4 | 1.4 | 1.4 | 1.4 | 1.4 |
| Accelerator (8) | 1.4 | 1.4 | 1.4 | 1.4 | 1.4 | 1.4 |
| Volume fraction of the reinforcing filler | 15.5% | 9.2% | 9.1% | 9.1% | 15.2% | 12.4% |

(1) natural rubber;
(2) polybutadiene CB 24 from Lanxess with 96% (molar %) of cis;
(3) carbon black N683 (BET equal to 39 m²/g; COAN: 89 ml/100 g);
(4) carbon black SR401 from Sid Richardson (BET: 62 m²/g; COAN: 107 ml/100 g);
(5) mixture of 60% of N347 (BET: 88 m²/g; COAN: 98 ml/100 g) and 40% of N683;
(6) MES oil (Flexon 683, Exxon Mobil);
(7) N-1,3-dimethylbutyl-N'-phenyl-para-phenylenediamine (6-PPD);
(8) N-cyclohexyl-2-benzothiazylsulphenamide (Santocure CBS from Flexsys).

The dynamic properties of these compositions A, B, C, D, E and F are measured in order to determine the rolling resistance performance. The rolling resistance performance results appear in Table 2.

TABLE 2

| | A (control) | B | C | D | E | F |
|---|---|---|---|---|---|---|
| Rolling resistance | 100 | 143 | 143 | 137 | 95 | 91 |

Only compositions B, C and D in accordance with the invention have an improved rolling resistance index compared to control composition A. Compositions E and F, which differ from B and C by the volume fraction and the content of reinforcing filler that are not in accordance with the invention, have a degraded hysteresis compared to the control, which means a higher rolling resistance of the sidewalls containing compositions E and F compared to the control. These compositions E and F that adversely affect the rolling resistance cannot therefore satisfy the technical problem of the invention which aims to improve the curbing resistance of the sidewall without adversely affecting the good crack resistance and low rolling resistance performances, and have not therefore been evaluated with respect to the curbing resistance and crack resistance of the sidewalls.

Compositions A, B, C and D were therefore used to form sidewalls of tires of dimension 205/55R16, each sidewall being formed of a single portion ranging from the bead to the contact point with the tread. These tires are identical, with the exception of the composition constituting their respective sidewalls. The tires of dimension 205/55R16 are tested under nominal (pressure, load, rim) conditions as defined by the ETRTO standard.

The curbing resistance and crack resistance performances of sidewalls FA, FB, FC and FD having the respective compositions A, B, C and D, are presented in Table 3.

TABLE 3

| | Curbing resistance | Crack resistance |
|---|---|---|
| FA (control) | 100 | 100 |
| B | 116 | No propagation of the notches |
| C | 123 | 125 |
| D | 118 | 100 |

It is surprisingly observed that the sidewalls FB and FC in accordance with the invention, i.e. comprising a carbon black with a BET specific surface area equal to 62 m²/g (at 28 phr and 25 phr respectively for a respective volume fraction of the reinforcing filler of 9.2% and 9.1%) have higher curbing resistance indices than control sidewall FA. These results are particularly astonishing because, with respect to the prior art, it is known by those skilled in the art that a decrease of the content and of the volume fraction of reinforcing filler has the result of degrading the wear resistance performance, in particular the curbing resistance performance.

Furthermore, the improvement in terms of crack performance is also very substantial, whether for sidewall FB or sidewall FC in accordance with the invention, and more particularly for sidewall FB that does not have any propagation of the initial notches under the test conditions.

It is also observed that the sidewall FD in accordance with the invention, comprising a mixture of carbon blacks with a specific surface area equal to 64 m²/g, also has a higher curbing resistance than control sidewall FA, with a level of crack resistance at least of the same order as the control FA.

It is recalled that the reinforcing filler of the composition D is in fact a mixture of carbon blacks consisting of 10 phr of N347 and 15 phr of N683. It is therefore noted that this compromise of performances is in particular achieved with a mixture of carbon blacks, the specific surface area of which is between 50 m²/g and 69 m²/g (in so far as the other features of the composition are also adhered to, especially volume fraction and content of reinforcing filler), even though the respective specific surface area of each of the carbon blacks of the mixture is outside of the range in accordance with the invention ranging from 50 m²/g to 69 m²/g.

In summary, the substantial improvement of the curbing performance of the tires according to the invention is achieved neither at the expense of the rolling resistance performance nor at the expense of the crack performance. It is even, under certain reinforcing filler content and volume fraction conditions, accompanied by both a strong improvement of the rolling resistance and a strong improvement of the crack resistance, this being quite unexpected.

The invention claimed is:

1. A tire sidewall, comprising at least one portion having a rubber composition based on at least:
    a diene elastomer,
    a crosslinking system, and
    a reinforcing filler,
    wherein the content of reinforcing filler in the rubber composition varies from 20 to 40 parts by weight per hundred parts of elastomer, phr,
    wherein the volume fraction of reinforcing filler in the rubber composition ranges from 8.0% to 13.0%, and
    wherein this reinforcing filler comprises predominantly a carbon black or a mixture of carbon blacks, the BET specific surface area of which ranges from 50 m²/g to 69 m²/g.

2. The tire sidewall according to claim 1, wherein the carbon black or the mixture of carbon blacks with a BET specific surface area ranging from 50 m²/g to 69 m²/g is mixed with one or more other organic or inorganic reinforcing fillers.

3. The tire sidewall according to claim 1, wherein the carbon black or the mixture of carbon blacks with a BET specific surface area ranging from 50 m²/g to 69 m²/g constitutes at least 85% by weight of the reinforcing filler.

4. The tire sidewall according to claim 3, wherein the carbon black or the mixture of carbon blacks constitutes at least 95% of the reinforcing filler.

5. The tire sidewall according to claim 1, wherein the carbon black or the mixture of carbon blacks with a BET specific surface area ranging from 50 m²/g to 69 m²/g constitutes 100% of the reinforcing filler.

6. The tire sidewall according to claim 1, wherein the carbon black or the mixture of carbon blacks with a BET specific surface area ranging from 50 m²/g to 69 m²/g has a COAN oil absorption number ranging from 80 ml/100 g to 120 ml/100 g.

7. The tire sidewall according to claim 1, wherein the proportion of reinforcing filler in the composition varies from 20 phr to 35 phr.

8. The tire sidewall according to claim 7, wherein the proportion of reinforcing filler in the composition varies from 25 phr to 30 phr.

9. The tire sidewall according to claim 7, wherein the volume fraction of the reinforcing filler in the composition varies from 8.0% to 10.0%.

10. The tire sidewall according to claim 9, wherein the volume fraction of the reinforcing filler in the composition varies from 8.7% to 9.4%.

11. The tire sidewall according to claim 1, wherein the rubber composition comprises a mixture of elastomers composed of 30 to 55% of natural rubber, of a synthetic polyisoprene or of a mixture of natural rubber and of a synthetic polyisoprene, and of 45 to 70% of a diene elastomer chosen from polybutadienes, styrene-butadiene copolymers, isoprene-butadiene copolymers, isoprene-styrene copolymers and isoprene-butadiene-styrene terpolymers and mixtures thereof.

12. The tire sidewall according to claim 11, wherein said diene elastomer is a polybutadiene.

13. The tire sidewall according to claim 12, wherein the polybutadiene is a cis-1,4-polybutadiene.

14. The tire sidewall according to claim 1, wherein the rubber composition comprises a plasticizer.

15. The tire sidewall according to claim 1, wherein the at least one portion of sidewall is located on an outer face of the sidewall.

16. The tire sidewall according to claim 1, wherein the at least one portion of sidewall extends over the entire distance from the crown to the bead.

17. A tire comprising a sidewall according to claim 1.

18. A process for preparing a tire sidewall composition based on at least a diene elastomer, a crosslinking system and a reinforcing filler, wherein the content of reinforcing filler in the composition varies from 20 to 40 phr with a volume fraction of reinforcing filler in the composition ranging from 8.0% to 13.0%, and wherein this reinforcing filler comprises predominantly a carbon black or a mixture of carbon blacks with a BET specific surface area ranging from 50 m²/g to 69 m²/g, comprising:
    thermomechanically kneading the diene elastomer and the reinforcing filler until a maximum temperature of between 110° C. and 190° C. is reached;
    cooling the mixture down to a temperature below 100° C.;
    then incorporating the crosslinking system;
    kneading everything until a maximum temperature below 110° C. is reached in order to obtain a rubber composition,
    calendering or extruding the rubber composition.

19. The process according to claim 18, wherein the proportion of the reinforcing filler in the composition varies from 20 phr to 35 phr.

20. The process according to claim 19, wherein the proportion of reinforcing filler in the composition varies from 25 phr to 30 phr.

21. The process according to claim 19, wherein the volume fraction of the reinforcing filler in the composition varies from 8.0% to 10.0%.

22. The process according to claim 21, wherein the volume fraction of reinforcing filler is from 8.7% to 9.4%.

23. The process according to claim 18, wherein the carbon black or the mixture of carbon blacks with a BET specific surface area ranging from 50 m²/g to 69 m²/g constitutes at least 85% by weight of the reinforcing filler.

* * * * *